US008726307B2

United States Patent
Legallais et al.

(10) Patent No.: US 8,726,307 B2
(45) Date of Patent: May 13, 2014

(54) METHOD FOR RECEIVING AND DISPLAYING THEMATIC AUDIO-VISUAL PROGRAMME SEQUENCES, AND RECEIVER THEREFOR

(75) Inventors: Yvon Legallais, Rennes (FR); Sebastien Perrot, Rennes (FR); Philippe Schmouker, Betton (FR)

(73) Assignee: Thomson Licensing, Boulogne-Billancourt (FR)

( * ) Notice: Subject to any disclaimer, the term of this patent is extended or adjusted under 35 U.S.C. 154(b) by 662 days.

(21) Appl. No.: 10/311,726

(22) PCT Filed: Jun. 27, 2001

(86) PCT No.: PCT/FR01/02037
§ 371 (c)(1),
(2), (4) Date: Jul. 18, 2003

(87) PCT Pub. No.: WO02/01863
PCT Pub. Date: Mar. 1, 2002

(65) Prior Publication Data
US 2004/0031047 A1 Feb. 12, 2004

(30) Foreign Application Priority Data

Jun. 27, 2000 (FR) ..................................... 00 08240

(51) Int. Cl.
*H04N 7/10* (2006.01)
*H04N 7/025* (2006.01)
*H04N 7/16* (2011.01)
(52) U.S. Cl.
USPC ................ 725/32; 725/36; 725/41; 725/131; 725/139; 725/151

(58) Field of Classification Search
CPC . H04N 21/812; H04N 21/431; H04N 21/458; H04N 21/434; H04N 5/44543
USPC ........... 725/32–36, 131, 139, 151, 42, 43, 41, 725/134, 142; 386/239
See application file for complete search history.

(56) References Cited

U.S. PATENT DOCUMENTS

| 4,930,158 | A | * | 5/1990 | Vogel | 386/253 |
| 5,559,548 | A | * | 9/1996 | Davis et al. | 725/40 |
| 5,652,615 | A | * | 7/1997 | Bryant et al. | 725/35 |

(Continued)

FOREIGN PATENT DOCUMENTS

| CN | 1175851 | 3/1998 |
| EP | 0822713 | 3/1998 |

(Continued)

*Primary Examiner* — Pinkal R Chokshi
(74) *Attorney, Agent, or Firm* — Robert D. Shedd; Brian J. Cromarty (57) ABSTRACT

The invention consists of a process for receiving and for screening audiovisual transmissions broadcast by a network. The transmissions consisting of events and of short transmissions possessing a distinctive element, these short transmissions being broadcast by services identifiable by this distinctive element. At a certain moment specified by the broadcaster, a sequence is transmitted on the network, it is replaced at the level of the display of the receiver by another sequence extracted from a service broadcasting short transmissions. The choice of this service is made at the receiver level. To avoid the appearance of a black screen between the network's transmitted sequences and the short transmissions, the receiver dispatches a filler transmission to the screen.
The invention also consists of a digital television receiver for implementing the process.

6 Claims, 6 Drawing Sheets

(56) References Cited

U.S. PATENT DOCUMENTS

| | | | |
|---|---|---|---|
| 5,859,660 A * | 1/1999 | Perkins et al. | 725/32 |
| 5,892,535 A * | 4/1999 | Allen et al. | 725/36 |
| 6,023,267 A | 2/2000 | Chapuis et al. | |
| 6,029,045 A * | 2/2000 | Picco et al. | 725/34 |
| 6,169,542 B1 * | 1/2001 | Hooks et al. | 715/719 |
| 6,463,585 B1 * | 10/2002 | Hendricks et al. | 725/35 |
| 6,553,178 B2 * | 4/2003 | Abecassis | 386/291 |
| 6,574,793 B1 * | 6/2003 | Ngo et al. | 725/32 |
| 6,601,237 B1 * | 7/2003 | Ten Kate et al. | 725/47 |
| 6,698,020 B1 * | 2/2004 | Zigmond et al. | 725/34 |
| 6,704,930 B1 * | 3/2004 | Eldering et al. | 725/36 |
| 6,788,882 B1 * | 9/2004 | Geer et al. | 386/243 |
| 7,068,724 B1 * | 6/2006 | Hamilton | 375/240.26 |
| 7,080,392 B1 * | 7/2006 | Geshwind | 725/34 |
| 7,640,560 B2 * | 12/2009 | Logan et al. | 725/32 |
| 2001/0052135 A1 * | 12/2001 | Balakrishnan et al. | 725/135 |
| 2002/0013943 A1 * | 1/2002 | Haberman et al. | 725/39 |
| 2003/0093790 A1 * | 5/2003 | Logan et al. | 725/38 |
| 2005/0076359 A1 * | 4/2005 | Pierson et al. | 725/32 |
| 2005/0166224 A1 * | 7/2005 | Ficco | 725/35 |
| 2005/0193410 A1 * | 9/2005 | Eldering | 725/34 |

FOREIGN PATENT DOCUMENTS

| | | | |
|---|---|---|---|
| EP | 967804 | 12/1999 | H04N 7/24 |
| WO | 99/52285 | 10/1999 | H04N 7/173 |
| WO | 99/66719 | 12/1999 | H04N 5/44 |
| WO | 00/33197 | 6/2000 | G06F 13/00 |

\* cited by examiner

METHOD FOR RECEIVING AND DISPLAYING THEMATIC AUDIO-VISUAL PROGRAMME SEQUENCES, AND RECEIVER THEREFOR

The invention relates to a method of receiving and of screening audiovisual transmissions broadcast by a transmitter to receivers and more especially when the transmissions are selectable as a function of a specified criterion. The invention also relates to the receivers for implementing the method.

The invention applies more particularly to digital television receivers/decoders. The network broadcasts audiovisual transmissions more commonly referred to as "events" and data intended for referencing them. These data are for example defined in the DVB-SI specifications ("Digital Video Broadcast—specification for Service Information") EN 300 468 V1.3.1 (published by the ETSI). They take the form of tables and of descriptors which describe the objects transmitted on the broadcasting network. A service is an uninterrupted series of events broadcast on a specified stream.

The DVB-SI standard defines in particular the format of following tables such as: NIT, SDT, EIT and possibly BAT. The NIT table gives the general structure of the network and indicates the list of transport streams and services broadcast. The SDT table gives additional information relating to the services, for example the unencrypted name of a service. The EIT table indicates a list of events for each service, and makes it possible in particular to indicate the events currently being broadcast. The BAT table contains information on several services clustered together into a bouquet of services which can be output by several broadcasting networks.

With the aid of the data contained in these tables, the receiver knows the general content of the audiovisual transmissions broadcast by the network. The user can thus search for transmissions and services as a function of certain criteria, such as topic.

Televised programmes are often intercut with relatively short sequences composed for example of advertising flashes, or of information flashes, or else of a video clip, or diverse audiovisual transmissions whose durations vary from about ten seconds to several minutes. These sequences are broadcast, either between two events, or during an event. The user can choose the event which he watches, this is the "current" event broadcast by the "current" service but he does not choose the content of the sequences. The short transmissions making up the sequence have no topic related to the current event. Hence, the viewer may grow weary of these sequences whose content is of little overall interest to him. He might be inclined to change services. The present invention makes it possible to offer the user sequences of more interest to him.

The subject of the invention is a process for screening audiovisual transmissions transmitted by a centre and received by a television receiver, transmissions of a first type being broadcast on a first broadcasting service and being selectable by the user, the process comprising at the receiver level:

a first step of screening a transmission of a second type extracted from a second broadcasting service selected by the receiver, a second step of screening at least one transmission of a first type commencing at a first moment specified by the centre, and characterized in that it comprises a third step of screening a filler transmission, the said transmission being screened following the screening of the second transmission and stopping at the start of the screening of the first transmission.

It should be noted straightaway that the audiovisual transmissions to which the present invention relates may be provided either by a unidirectional or bidirectional network. The transmissions of second type are broadcast continuously on several services each corresponding to a particular topic. At a precise instant of the current event, the data selected for display are switched from the current service to the service broadcasting transmissions of second type. The broadcaster specifies the duration of screening of the transmissions of the second type. When this duration has elapsed, the receiver switches the screening onto the current service. The receiver selects the service broadcasting the transmissions of the second type. The sequence broadcast in the current service is thus replaced with a sequence of transmissions of second type whose topics correspond better to a criterion specific to the receiver. The broadcasting of the various transmissions of second type is not synchronized with the sequences specified in the announcement signals, this generally entailing the untimely curtailing of at least one transmission of second type, at the start and/or at the end of the sequence. Moreover, the switching times are not negligible and therefore, may entail the appearance of a black screen for a few instants. To avoid this the present invention makes provision to replace the black screen with a filler transmission, this making it possible to eliminate any discontinuities of the audiovisual programme. The receiver displays a filler transmission at the start and/or at the end of the sequence.

According to one embodiment, this criterion for selecting the filler transmissions corresponds to the profile of the user.

The announcement signal contains a temporal indication of the start of the sequence. According to a particularly simple embodiment, the decoder switches from the current service to a topic-based service following the receipt of the announcement signal.

According to a particular embodiment, the receiver is furnished with a memory for recording audiovisual transmissions for real-time storage of the transmission of second type corresponding to the criteria stored in the receiver. The transmission currently being recorded is screened at the start of the advertising sequence.

The subject of the invention is also a receiver of audiovisual transmissions comprising a means of receiving data broadcast from a network consisting of at least one first service broadcasting transmissions of a first type which are selectable by the user and of a plurality of second services broadcasting transmissions of a second type, of a means of switching from one service to another service and a means for sending the transmissions to a screening facility, characterized in that it comprises a means for interposing a filler transmission between a transmission of a second type and a transmission of a first type received from the network.

Other characteristics and advantages of the present invention will emerge from the description of the exemplary embodiments which will follow, taken by way of nonlimiting examples, with reference to the appended figures in which.

Figure 3:
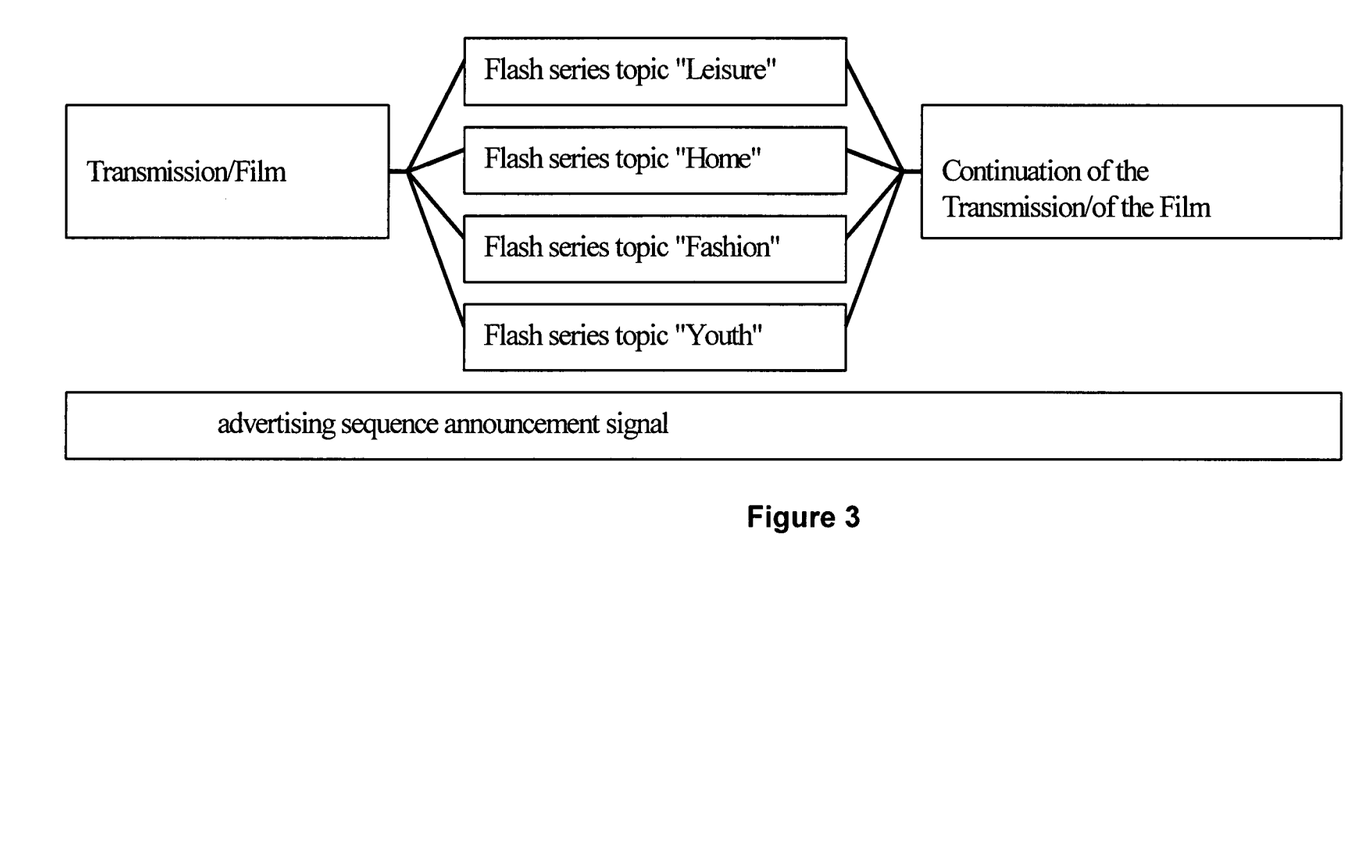
FIG. 3 represents the diagram of the mechanism for switching services according to the invention, FIG. 4 represent timing diagrams of the transmission and screening of the transmissions according to a preferred embodiment, FIG. 5 represent timing diagrams for the broadcasting, storage and screening of transmissions according to an improvement.

A receiver according to the invention will first of all be described, followed, as represented in FIG. 3, by the mechanism for switching to the services broadcasting transmissions of the second type. Finally, improvements and variant embodiments will be described.

Figure 1:
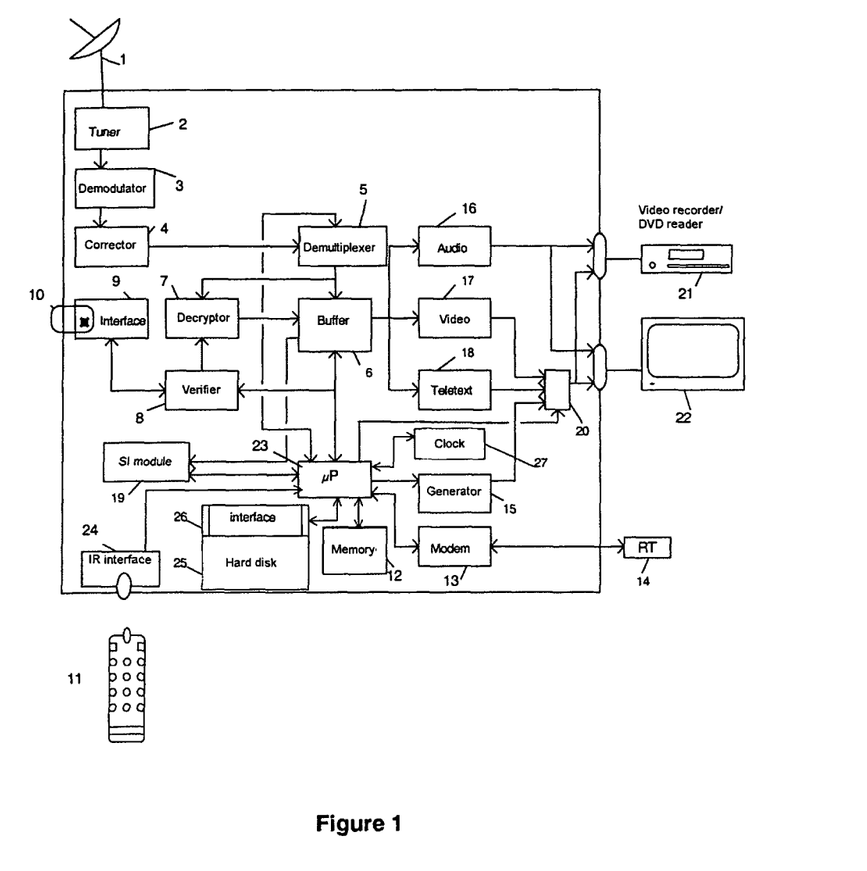
FIG. 1 represents a receiver implementing the invention.

A receiver according to the invention is described in FIG. 1. The receiver is, for example, a decoder in accordance with the DVB specifications. It uses an ISO/IEC 13818-1 transport layer.

The decoder is linked to an antenna 1, itself linked to a tuner. We shall see subsequently that there may be two of them. The signal provided by the tuner is demodulated by a demodulator 3. The demodulated data are deinterlaced and corrected by an error-correcting circuit 4 and sent to a demultiplexer 5. The latter comprises a certain number of filters programmed by a microprocessor 23 as a function of the various applications supported by the decoder. The microprocessor 23 is connected to a memory 12 comprising the operating system as well as the resident or downloaded programs for implementing applications. The memory is illustrated in the form of a single block, but physically may comprise several blocks of different kinds; random access memory RAM, read only memory ROM, reprogrammable memory EEPROM or FLASH. The microprocessor is also connected to a clock circuit 27. A character generator 15 allows the generation of control or graphics menus relating to the parameters of the decoder or to a particular application. The video signal generated is multiplexed with one of the video signals originating from the video decoder 17 to a SCART socket linked to a television screen 22. The multiplexing circuit 20 is managed by the microprocessor 23. For the clarity of the diagram, only the most important connections of the microprocessor 23 are illustrated.

The audio or video sections or packets filtered by the demultiplexer are stored in predefined areas of a buffer memory 6. The decoder may also comprise a hard disk 25 linked to the microprocessor with the aid of an interface 26 allowing fast transfers of information. The decoder is also furnished with a remote control 11, linked to the microprocessor by an infrared link.

It was stated previously that the broadcasting network may be unidirectional (over-the-air or satellite network) or bidirectional (by wire, cable, Internet, for example). Specifically, it is unnecessary for the receiver to send messages to the broadcaster via the same means of communication as the network for broadcasting the audiovisual data. The broadcasting network transmits so-called general services, the user selects the current service from them so as to watch the current event. The network also transmits so-called "topic-based" services. The topic-based services continuously broadcast short audiovisual transmissions (called "flashes" subsequently in the document) possessing the same topic for a given channel. The list of references for accessing the topic-based services as well as the topic associated with each service is extracted from the NIT tables. A proprietor field contains an indicator specifying that the service is "topic-based".

The programme memory of the decoder contains a software module for Managing the Flashes, or GF module. One of the functions of this module consists in creating the above-mentioned array. The other functions will be described subsequently.

The GF module comprises a programming part consisting in searching for the topics broadcast and in receiving from the user the criterion for selecting the flashes to be screened.

First of all, the decoder analyses the NIT tables in order to determine the number and the topic of the topic-based services currently being broadcast. The EIT table gives in particular the description of the content of the events (and hence of the flashes which are short events), by virtue of its descriptors. The descriptors authorize the coding of proprietary data owned by the broadcaster, thus making it possible to broadcast contents (the tag content_descriptor), according to a standardized format. The present invention introduces new fields into these descriptors, specifying therein: the description of a flash, the topic or topics of the flash, the start of transmission (date and time coded on 40 bits), the duration (coded on 24 bits), etc. The EIT table contains, in particular a field coded on 12 bits which authorizes a maximum length of 4093 bytes for transporting the descriptors.

These latter descriptors are used by the broadcaster to describe the content of the event, and hence for example the topic to which it belongs. They may be of two types:
1. the "content_descriptor" descriptors of standardized identifier: 0x54 in hexadecimal,
2. the "user defined" descriptors of standardized identifier from 0x80 à 0xFE in hexadecimal.

If the descriptor of type "content_descriptor" is used to code the topic or topics of an event, a size coded on 8 bits is available, and hence 256 bytes are available, this being amply sufficient.

A descriptor coding which can be recommended is the following (described as are the descriptors in the DVB-SI standard):

```
broadcaster_defined_content_descriptor( ) {
    descriptor_tag                           8 bits uimsbf
    descriptor_length                        8 bits uimsbf
    for (i=0; i<N; i++) {
        descriptor_content_byte              8 bits uimsbf
    }
}
``` with:
descriptor_tag: lies between 0x80 and 0xFE,
descriptor_length: the length of the content of the descriptor which follows the descriptor_length,
descriptor_content_byte: the coding of the topic or topics to which the event corresponds, and which the broadcaster wishes to specify (normally the coding must fit into a byte, but a variable size of the content makes it possible to associate one and the same event with several topics).

By analysing the content of the descriptors contained in the EIT tables, the decoder creates in its memory the array 1 below which contains the list of references for accessing the topic-based services currently being broadcast (Id-service_i) and the associated topics and subtopics.

| ARRAY 1 | | |
|---|---|---|
| Information: | Sports | Id_service_1 |
| | Economics | Id_service_2 |
| | Politics | Id_service_3 |
| Advertising: | Leisure | Id_service_4 |
| | Home | Id_service_5 |
| | Fashion | Id_service_6 |
| | Youth | Id_service_7 |
| Video Clips: | Rap | Id_service_8 |
| | Techno | Id_service_9 |

-continued

ARRAY 1

| | |
|---|---|
| Rock | Id_service_10 |
| Classical | Id_service_11 |
| Jazz | Id_service_12 |

In the example of array 1, three main topics are offered: Information, Advertising and Video Clips, and for this set of three topics, twelve subtopics. In the example the network comprises twelve topic-based services.

Figure 2:
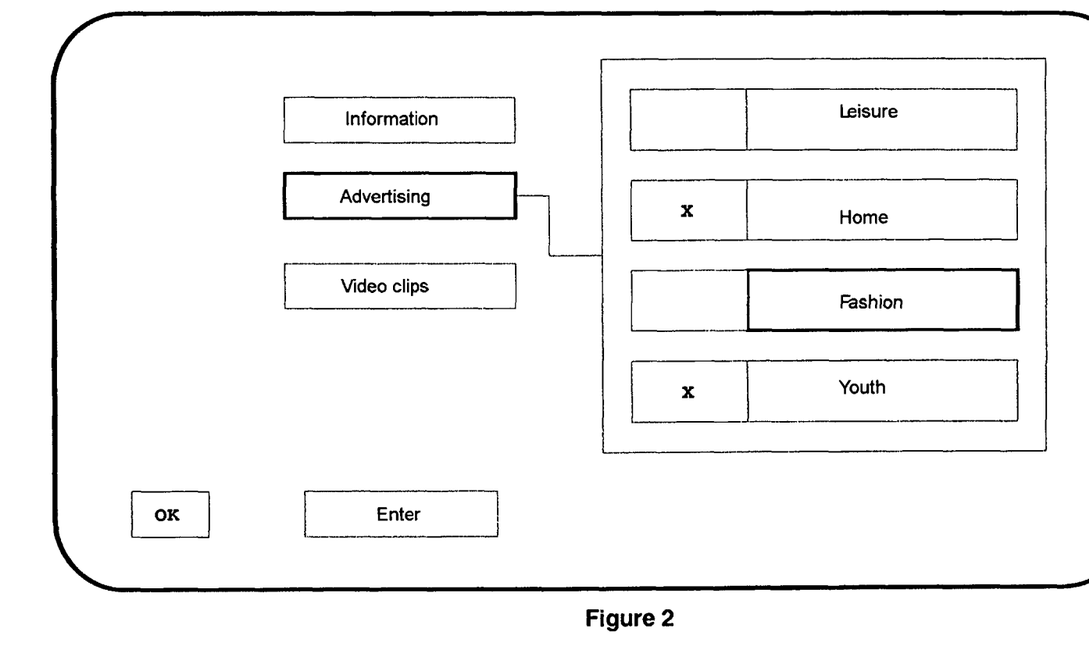
FIG. 2 shows an exemplary appearance of a screen for the programming of the display mechanism.

Next, the user executes the programming part enabling him to input the criterion for selecting the topic-based service. The menu displayed in FIG. 2 then appears, its content is formulated directly on the basis of array 1. The user navigates around this menu with the aid of the four direction keys of his remote control. The element pointed at is picked out by either emboldening its outline, with the aid of the highlighted or flashing title, or any other graphical distinguishing means. The first list indicates the topic, each topic affords access to a second particular list of subtopics. In the example of FIG. 2, the "Advertising" topic is selected and the "Fashion" subtopic is picked out. The user currently has the choice of selecting or otherwise this criterion. The "←" and "→" keys are used to go between the two lists. The "OK" key makes it possible to select what causes the "X" symbol to appear on the left of the subtopic thus signalling its selection. In order to no longer select it, it is sufficient to press the "OK" key again. The "enter" key enters the selection as a whole and quits the programming part of the GF module.

If the user selects nothing, the GF module will not be operational, the sequences of flashes initially provided by the broadcaster will not be replaced. Otherwise, following the execution of the programming part of the GF module, the decoder programmes its demultiplexer and its second tuner if it has one, so as to receive the data of the service corresponding to the first subtopic selected. If subsequently this service ceases to transmit, the decoder goes to another selected service.

The general principle of the GF module during operation is shown in FIG. 3. An event extracted from the current service is screened. At a certain moment, the broadcaster transmits in the data of this service and between two blocks of audiovisual data, an announcement signal specifying that a sequence of a certain duration will soon be broadcast. At the moment specified in the announcement signal, the decoder programmes its demultiplexer so as to receive the data of the service broadcasting flashes corresponding to the criteria defined by the user. For example, the user preferring advertisements relating to fashion, the demultiplexer selects the service broadcasting flashes having "Fashion" as topic. If the user has chosen several topics, the services broadcasting them are successively selected by the GF module. When all have been screened once, the first is selected again. This selection is performed with the aid of a pointer addressing in the array 1 the services whose topics are chosen by the user. At the end of the duration specified in the announcement signal, the demultiplexer is programmed again so as to receive the data of the current service which are sent to the television screen.

The announcement signal comprises the following information:

| Service identifier | Current time | Instant t1 | Duration D1 |
|---|---|---|---|

Advantageously, the announcement signal is repeated several times so as to be properly received by all the decoders. By virtue of the "Current time" data item, the decoder resynchronizes its clock to commence at the precise instant t1 the screening of the sequence of a duration D1.

According to a very simplified embodiment, the broadcaster sends only a single announcement signal at the instant at which the sequence starts. In this signal, the "Current time" and "Instant t1" fields are unnecessary and can be eliminated.

The flashes are broadcast continuously in the topic-based services. The start of the sequence (instant T1) does not generally coincide with the start of a flash. So as not to switch during the broadcasting of a flash and thereby cause a part to be missed, the decoder sends a filler event to the screen.

Figure 4A:
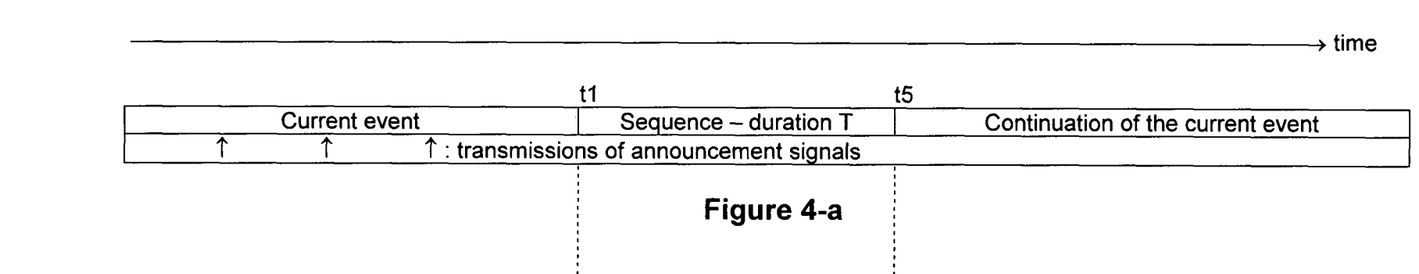
Figure 4B:
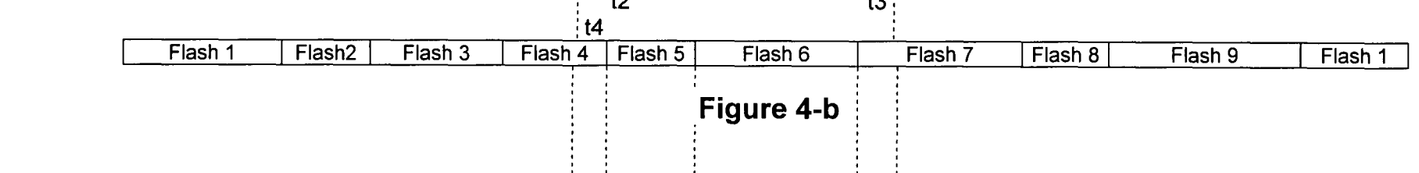
Figure 4C:
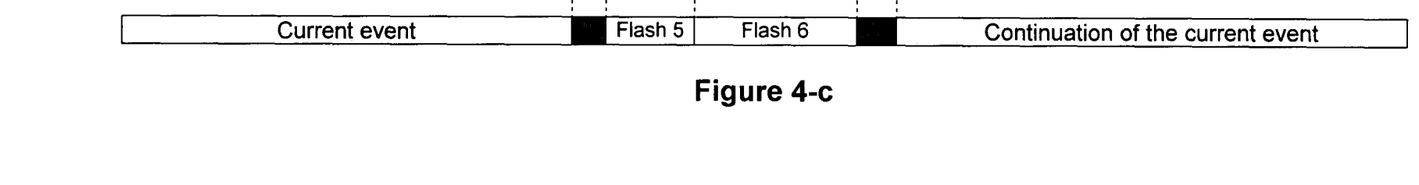

FIG. 4 show the timing diagram of the transmissions broadcast on the current service (FIG. 4-a), the topic-based service (FIG. 4-b) and the transmissions screened (FIG. 4-c). They show in particular the moment of transmission of the filler event. The announcement signals transmitted between the blocks of audiovisual data of the current event contain a data item indicating the broadcasting at the instant t1 of a sequence. This sequence contains flashes whose topics are diverse. It is screened when the user does not specify any criterion or when the decoder is not furnished with the GF module. At the same time, the topic-based service continually transmits flashes in a loop. In the example of FIG. 4-b, the topic-based service displayed transmits 9 different flashes having the same topic.

According to a first embodiment, switching between the current service and a topic-based service is effected directly. This first embodiment is simple but has the drawback of cutting the flashes. The description which will follow incorporates the improvement enabling this problem to be solved.

The instant t1 occurs at the moment of the broadcasting of the flash 4. The flash 5 which is broadcast at the moment t2 after t1, can be screened in full. To avoid screening just a part of the flash 4, the decoder sends a filler event to the screen in the course of the moment delimited by t1 and t2. A filler event possesses an audiovisual content whose duration of screening is of no importance to the viewer. It is for example a still image enlivened by music. It may also be a documentary about a region. The objective of a filler event is to occupy the television screen between the moment t1 and the start of the next flash. It also makes it possible to do away with the brief black screen which appears when switching services. At the moment t2, the decoder checks that the flash 5 has a sufficiently short duration for it to be completely incorporated in the sequence. Since this is the case, the flash 5 is screened. At the instant t3, the flash 6 is received and, after having undergone the same check, is screened. At the instant t4, the flash 7 is received. The duration of this flash is greater than the remaining duration of the sequence, there is therefore no longer enough time to screen it. The GF module sends the screen a filler event which is screened up to the instant t5 which terminates the sequence. The current programme is then screened again.

Advantageously, the filler event is a looped audiovisual programme in which it is impossible to discern the start transition and end transition. The duration of the loop must be sufficiently long for the user not to see the same parts too often.

According to a preferred embodiment, the filler event is unique and is recorded in a memory of the decoder. Thus, switching is fast and does not leave any black screen appearing on the screen. The size of the memory occupied is generally short (especially if this event is a picture with music), the filler event can be stored in a part of the work memory, or if it is too long, in the hard disk 25.

A variant consists in the network broadcasting in addition to the topic-based services a so-called "filler" service permanently broadcasting a filler event. According to this variant, the GF module searches through this service for the filler event and stores it in memory. The broadcaster can change the filler event, for example, once a day.

At the precise moment specified by the broadcaster in the announcement signal, the event interrupted by the sequence must resume. The data selected for display are then switched from the service broadcasting transmissions of second type to the current service.

Figure 5A:
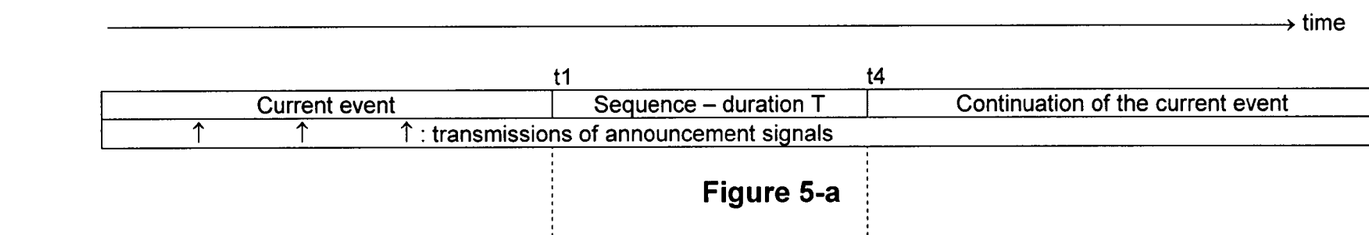
Figures 5B, 5C:
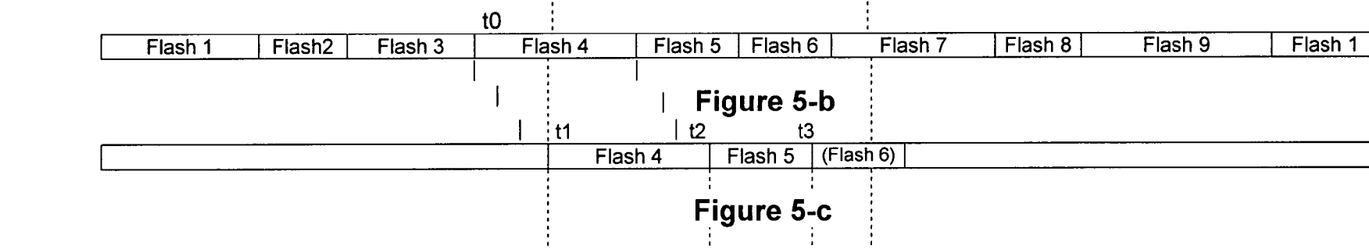
Figure 5D:
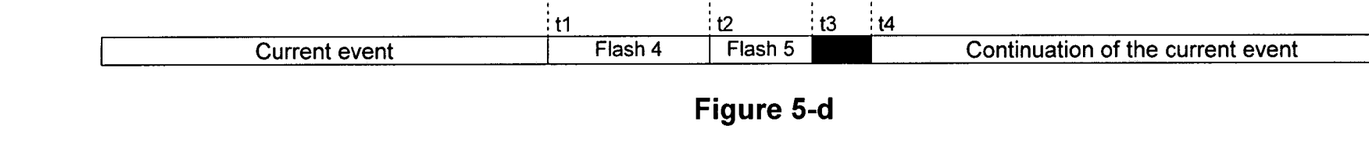

An improvement of the present invention consists in using a memory of large capacity to record at least one flash. This memory can consist of a memory circuit of large capacity, or of a small hard disk (such as that represented at 25 in FIG. 1), or of a magnetic tape. According to the present improvement, the decoder constantly records the flash broadcast by the selected topic-based service, that is to say the "current flash". A new flash received overwrites the previous one. FIG. 5 show the timing diagram of the transmissions broadcast on the current service (FIG. 5-*a*), the topic-based service (FIG. 5-*b*), the transmission read from the memory by the GF module (FIG. 5-*c*) and the screened transmissions (FIG. 5-*d*).

When the sequence commences (instant t1), the GF module stops the screening of the current event and reads the content of the flash memory at the start of the recording of the flash currently being broadcast. The broadcasting of this flash (4) commenced at the instant t0 and the flash is read at the instant T1. A time shift of (t1−t0) occurs between the receipt and the screening of the flash 4 and of those which will be screened thereafter. For this reason, this equipment is called a "Time Shifter". At the end of the screening of the flash 4 (instant t2), the GF module determines whether the next flash (flash 5) can be screened completely before the end of the sequence. This is the case: the flash 5 is therefore sent to the screen. At the end of the screening of the flash 5, the GF module checks whether the flash 6 can also be screened but this is not the case. The GF module completes the remainder of the sequence to be displayed with a filler event until the instant t4 at which screening of the current event recommences. In this way, the screened sequence possesses the duration specified by the broadcaster. In certain cases this improvement makes it possible to reduce the screening time of the filler event and to add a flash to the sequence.

An improvement of the present invention consists in the user programming the distribution of topics. For each of the topics present in the array 1 the user specifies the proportion of display which he desires. The proportions are advantageously indicated as a percentage, the total of the values indicated being 100.

The array 2 below is an example of programming the distribution of themes. In the example, the user prefers especially the flashes of video clips of rap (he wants 50% of them), then the advertisements for the home (30%) and finally, the sports information (20%).

| ARRAY 2 | | | |
|---|---|---|---|
| Information: | Sports | Id_service_1 | 20 |
|  | Economics | Id_service_2 | 0 |
|  | Politics | Id_service_3 | 0 |
| Advertising: | Leisure | Id_service_4 | 0 |
|  | Home | Id_service_5 | 30 |

-continued

| ARRAY 2 | | | |
|---|---|---|---|
|  | Fashion | Id_service_6 | 0 |
|  | Youth | Id_service_7 | 0 |
| Video Clips: | Rap | Id_service_8 | 50 |
|  | Techno | Id_service_9 | 0 |
|  | Rock | Id_service_10 | 0 |
|  | Classical | Id_service_11 | 0 |
|  | Jazz | Id_service_12 | 0 |

Figure 6:
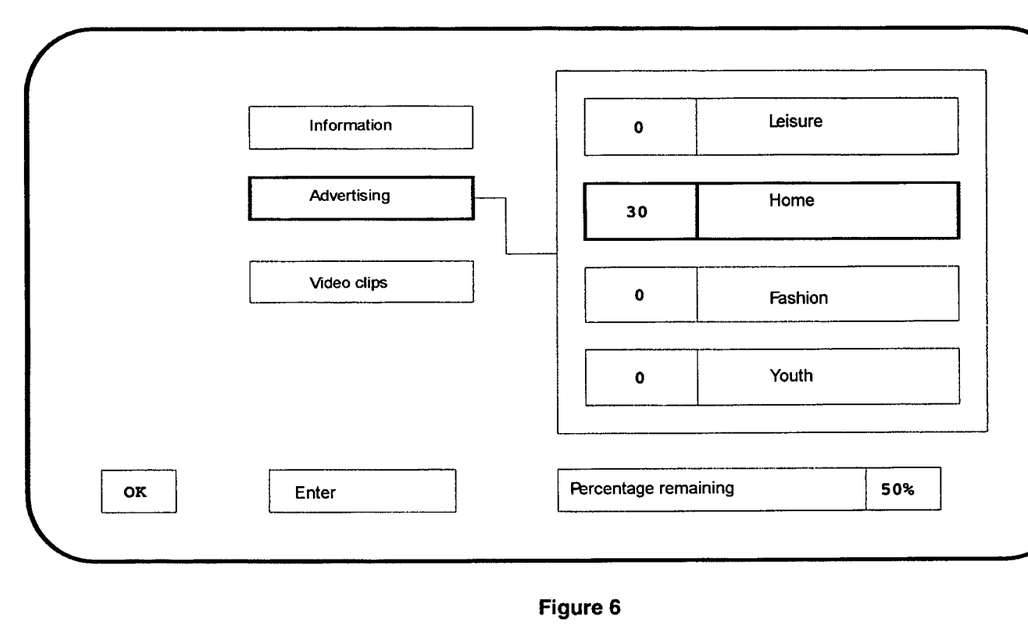
FIG. 6 represents an exemplary appearance of a screen for the programming of the various topics expected by a user.

The user specifies the proportions in the menu of FIG. 6 by running the programming part of the GF module and by inputting an integer from 0 to 100 with the aid of the keypad of his remote control. The icon at the bottom left indicates to the user the percentage which he still has to assign. In the example, he has specified 20% of sports information flashes, 30% of home advertising flashes, he therefore still has to assign 50% of flashes over one or more other themes. The user can obviously return to a choice with the aid of the navigation buttons.

A variant, aimed at simplifying the inputting of the choices, consists in the user allocating a scale, for example from 0 to 9, for each flash topic. The GF module then converts the values input into a percentage.

The user having entered his choices, the GF module creates the array 3 below in memory, this array possessing as many rows as there are themes for which the user has specified a non-zero number. The array contains four columns. The first and the second column identify the topic-based service. The third contains the percentages programmed by the user for each theme. The fourth contains counters for determining the number of flashes which have already been screened. The fourth column of the array is updated during each screening of a sequence by incrementing the value of the counter. At the start of the displaying of a sequence and at the end of each screening of a flash, the array is read and analysed by the GF module during normal operation so as to determine the topic-based service in which the decoder must search for the flash to be screened.

| ARRAY 3 | | | |
|---|---|---|---|
| Information/Sports | Id_service_1 | 20 (%) | 1 |
| Advertising/Home | Id_service_5 | 30 (%) | 1 |
| Video Clips/Rap | Id_service_8 | 50 (%) | 1 |

In the example of the above array 3, the GF module will select the topic-based service broadcasting "Information/Sports" once, will then select "Advertising/Home" twice and finally will select "Video Clips/Rap" four times. In a simple manner, the selection is performed by chronological scanning of the array.

A first manner of proceeding consists in updating the counters with the values programmed by the user and in decrementing them during each screening. When all the counters are at 0, they are reupdated with the programmed values. A first manner of working consists in the counters counting a number of screened flashes. Another method consists in counting the screening time for each topic. In the latter case, seconds are counted by adding up in each counter the durations (in seconds) of the flashes for each topic.

A variant consists in requiring that the minimum value of each topic be equal to 1, including in respect of those which the user announces to be of no interest and for which he programmes a zero value. This variant allows the broadcaster to ensure that each topic will be seen at least once after a is certain time, doing so while complying with the expected display proportions if the values for the topics of high interest to the user have sufficiently large values. This variant requires that the array 3 contain as many rows as there are broadcast topics and hence topic-based services.

Another variant consists in using a geometrical series to alter the starting value of the counters. In this variant the starting value of a counter is equal to k times (k>1) the value of the counter for the topic of immediately lower interest. The user therefore provides an ordering of the topics offered to him. This ordering is for example, from the most interesting to the least interesting. This gives:

for p[j] the weight of the j-th topic (0 is the index of the least interesting topic and n−1 the index of the most interesting topic, for n possible topics), and for k>1 we choose:

$$p[i]=k*p[i-1], \text{ with } p[0]=1$$

First of all, a counter, initialized at the start with the successive values of the series p[i], is associated with each topic by associating p[0] with the least preferred topic and p[n−1] with the most preferred topic. The associated counter is then decremented by 1 each time a topic is displayed. Thus the desired function is indeed achieved.

In this manner, the broadcaster has perfect control over the probabilities of display of each topic. Indeed, it may be demonstrated by recurrence that:

$$\text{Sum(for } i=0 \text{ to } n-1)[k\hat{}i]=((k\hat{}n)-1)/(k-1).$$

This shows that, for k=2 for example, the topic designated as the most desired will be displayed around 50% of the time, the next topic 25%, the next topic 12.5%, etc.

and for k=3, the probabilities become: 67%, 22%, 7%, etc
and for k=4: 75%, 19%, 5%, etc An improvement consists in assigning a priority to the flashes. To do this, the broadcaster sets up a priority flag in each flash descriptor indicating in a simple manner whether the latter does or does not have priority. It is recalled that this descriptor is in an EIT table and that in this way the decoder knows the topic, the duration and the priority of all the flashes broadcast by all the topic-based services. The decoder receives this indicator and the GF module processes it in the following manner: when a choice of topic-based service is possible, the GF module chooses the service with the most numerous priority flashes broadcast during the sequence announced. In the example illustrated by the array 3, the GF module can in fact display either "Information/Sports" or "Advertising/Home" or "Video Clips/Rap". According to the improvement, it analyses the priority of the flashes transmitted by the three topic-based services in the course of the sequence and selects the topic-based service which possesses the largest number of priority flashes in the course of the sequence. Advantageously for him, the broadcaster can demand a higher price from the providers who demand a higher priority for their flashes.

A variant of the improvement consists in assigning a priority level to each topic rather than a flag whose value is binary. For example, this level takes the values from 0 to 4, the value 4 being that of highest priority. According to this variant, the GF module adds up the priority levels of the flashes broadcast by the selectable services and in the course of the announced sequence, and selects the one which possesses the highest value.

Another variant of this improvement consists in assigning a weight designated by the broadcaster to each topic, thereby enabling certain topics to be given priority. This weight is used jointly with the weights designated by the user (for example by adding up the two weights), and thus modifies the values taken into account in respect of the counters at the moment of the selecting of a topic. This variant enables the broadcaster to "force", at the level of the receivers, the displaying of the flashes broadcast by a topic-based service declared to have priority.

A variant consists in the receiver automatically determining the profile of the user and correlating this profile with the topics offered. There is therefore no longer any need for the manual programming phase illustrated by FIG. 2. The profile can for example be determined on the basis of the actions of the user faced with certain flash in the course of a learning phase. For example, if the user often changes services when he sees advertising flashes in the fashion sector, the GF module deduces therefrom that he should no longer be presented with flashes of this topic. It then decreases the proportion dedicated to this topic, by 10% for example. In tandem with the screening of the sequences, the receiver refines the profile of the user. Let us assume that flash topics relate to events, when the user asks to see these events, the GF module increases the proportion of the corresponding topics. For example, if a user asks to see the televised news (which is an event) frequently, the GF module is warned and increases the proportion of the "information" topic by 10% for example.

An improvement consists in the GF module taking several users into account. The programming part then begins with the inputting of a user identifier, and each user inputs his profile or the distribution of the topics which he wishes to see appear in the flashes. The programming part of the GF module then creates as many distribution arrays as users. During normal execution, the users identify themselves, a single distribution array or profile is active at a time.

If the decoder has available just a single tuner, the programmes and the signalling must be multiplexed on one and the same channel in the form of data packets referenced by different PIDs. "Top of the range" decoders have available two tuners to receive signals originating from two broadcasting channels of different frequency. In this case, an improvement consists in programming a tuner to receive the current event and the announcement signals, and the other the topic-based service selected by the GF module. The data are stored in parallel in the memory as and when they are received. Switching between the current event and the flashes then takes place at the level of the procedure for reading the memory.

The invention is of course not limited to the embodiments just described.

The invention claimed is:

1. Process for screening audiovisual transmissions transmitted by a center and received by a television receiver, transmissions of events being broadcast on a first broadcasting service and being selectable by a user, said events being interrupted by at least one transmission of a first sequence, the at least one transmission of a first sequence being broadcast on the first broadcasting service, the process comprising at the receiver:

screening a part of said event broadcast before an interruption of the event by a transmission of the first sequence,
screening a filler transmission following the screening of the part of said event broadcast before the interruption of the event by a transmission of the first sequence, the screening of the filler transmission being not synchronized with the screening of the part of said event broadcast, the filler transmission being a still picture accompanied by looped sound content, the still picture and the sound content being recorded in the receiver, screening a portion of a transmission of a second sequence being broadcast on a second broadcasting service selected by the receiver, said second sequence comprising a plurality of flash events, said screening commencing at the starting point of a flash event of said plurality of flash events, the transmission of the second sequence being not synchronized with the transmissions of the first sequences and stopping the screening of the filler transmission at the time the screening of a flash event is commencing, and wherein the second sequence is selected in response to a user assigned percentage, the user assigned percentage relating to a distribution of content topics;

screening a part of said event which is broadcast after the transmission of the first sequence on the first broadcasting service is finished.

2. Process for screening audiovisual transmissions according to claim 1, comprising a prior step of screening a filler transmission, the filler transmission being screened following the screening of the end of a flash event of said plurality of flash events of said portion of the second sequence and stopping at the start of the screening of the event transmission at the end of the event interruption, the filler transmission being a still picture accompanied by looped sound content, the still picture and the sound content being recorded in the receiver.

3. Process for screening audiovisual transmissions according to claim 1, characterized in that an audiovisual or visual document used to produce the filler transmission is extracted from a specific broadcasting service before being recorded.

4. Process for screening audiovisual transmissions according to claim 3, characterized in that the audiovisual or visual document used to produce the filler transmission is regularly recorded in the memory of the receiver.

5. Process for screening audiovisual transmissions according to claim 1 wherein the second sequence comprising information flashes having a short duration compared to the events.

6. Process for screening audiovisual transmissions according to claim 5, characterized in that the information flashes have a duration of 10 seconds up to minutes.

* * * * *